US010868990B2

(12) United States Patent
Cheng et al.

(10) Patent No.: US 10,868,990 B2
(45) Date of Patent: Dec. 15, 2020

(54) ACTIVE PIXEL SENSOR AND DRIVING METHOD THEREOF, IMAGER AND ELECTRONIC DEVICE

(71) Applicant: BOE TECHNOLOGY GROUP CO., LTD., Beijing (CN)

(72) Inventors: Chih Jen Cheng, Beijing (CN); Pengpeng Wang, Beijing (CN); Wei Liu, Beijing (CN); Xiaoliang Ding, Beijing (CN); Rui Xu, Beijing (CN); Changfeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 3 days.

(21) Appl. No.: 16/071,623

(22) PCT Filed: Jan. 30, 2018

(86) PCT No.: PCT/CN2018/074540
§ 371 (c)(1),
(2) Date: Jul. 20, 2018

(87) PCT Pub. No.: WO2019/019589
PCT Pub. Date: Jan. 31, 2019

(65) Prior Publication Data
US 2019/0281242 A1   Sep. 12, 2019

(30) Foreign Application Priority Data

Jul. 25, 2017 (CN) .......................... 2017 1 0612873

(51) Int. Cl.
*H04N 5/374* (2011.01)
*H04N 5/378* (2011.01)

(52) U.S. Cl.
CPC ............. *H04N 5/374* (2013.01); *H04N 5/378* (2013.01)

(58) Field of Classification Search
CPC ...................................................... H04N 5/374
(Continued)

(56) References Cited

U.S. PATENT DOCUMENTS

| 9,825,082 B2 | 11/2017 | Kim et al. | |
| 2007/0241258 A1* | 10/2007 | Altice | H04N 3/155 |
| | | | 250/208.1 |

(Continued)

FOREIGN PATENT DOCUMENTS

| CN | 1767599 A | 5/2006 |
| CN | 101458537 A | 6/2009 |

(Continued)

OTHER PUBLICATIONS

International Search Report and Written Opinion dated Apr. 2, 2018.
First Chinese Office Action dated Apr. 2, 2019.

*Primary Examiner* — Joel W Fosselman
(74) *Attorney, Agent, or Firm* — Dilworth & Barrese, LLP.; Michael J. Musella, Esq.

(57) ABSTRACT

An active pixel sensor, a driving method thereof, an imager and an electronic device are disclosed. The active pixel sensor includes: a photosensitive element, configured to convert a received light signal into an electrical signal; a follower circuit, connected with the photosensitive element and configured to convert the electrical signal into an output voltage, the follower circuit including a source follower transistor; and an adjustment circuit, connected with the follower circuit and configured to collect the output voltage of the follower circuit and to adjust a bias current of the source follower transistor according to the output voltage, so as to adjust the output voltage to a preset range.

17 Claims, 3 Drawing Sheets

(58) Field of Classification Search
USPC .......................................................... 348/308
See application file for complete search history.

(56) References Cited

U.S. PATENT DOCUMENTS

| | | |
|---|---|---|
| 2018/0249109 A1 | 8/2018 | Yang et al. |
| 2018/0352200 A1 | 12/2018 | Matsumoto |

FOREIGN PATENT DOCUMENTS

| | | |
|---|---|---|
| CN | 2010074331 A | 4/2010 |
| CN | 105789202 A | 7/2016 |
| CN | 106060428 A | 10/2016 |
| CN | 106878633 A | 6/2017 |
| CN | 107426513 A | 12/2017 |

* cited by examiner

ACTIVE PIXEL SENSOR AND DRIVING METHOD THEREOF, IMAGER AND ELECTRONIC DEVICE

TECHNICAL FIELD

Embodiments of the present disclosure relate to an active pixel sensor, a driving method thereof, an imager and an electronic device.

BACKGROUND

An image sensor is a semiconductor device which converts optical image information to electrical signals. Complementary metal-oxide semiconductor (CMOS) image sensors have become a mainstream technology of an image sensor field. Compared with conventional image sensor technologies, a main characteristic of the CMOS image sensor is that the CMOS image sensor adopts an active pixel sensor (APS), which uses an active circuit to convert a charge to a voltage on a pixel and enlarge the voltage to a signal voltage having a driving capability, and then a pixel signal is transmitted to the outside of the sensor through conventional electronic circuit methods, so as to achieve the scan and output of an image signal.

SUMMARY

An embodiment of the present disclosure provides an active pixel sensor, comprising: a photosensitive element, configured to convert a received light signal into an electrical signal; a follower circuit, connected with the photosensitive element and configured to convert the electrical signal into an output voltage; and an adjustment circuit, connected with the follower circuit, and configured to collect the output voltage of the follower circuit and to adjust a bias current of a source follower transistor in the follower circuit according to the output voltage, so as to adjust the output voltage of the follower circuit to a preset range.

For example, the adjustment circuit comprises: a current source circuit, connected with the follower circuit and configured to keep a current of the source follower transistor in the follower circuit constant; and a current adjustment circuit, connected with the follower circuit and the current source circuit respectively, and configured to collect the output voltage of the follower circuit and to adjust an output current of the current source circuit according to the output voltage, so as to adjust the output voltage of the follower circuit to the preset range.

For example, the current adjustment circuit comprises: a collection circuit, connected with a column bus line and configure to collect the output voltage transmitted by the column bus line; a comparison circuit, connected with the collection circuit and configured to compare the output voltage with a preset voltage to obtain a voltage difference value; a judgment circuit, connected with the comparison circuit and configured to judge whether the voltage difference value is greater than a preset difference value or not; and a control circuit, connected with the judgment circuit and configured to generate a current control signal and send the current control signal to the current source circuit upon the voltage different value being greater than the preset difference value, so as to make the voltage difference value between the output voltage of the active pixel sensor and the preset voltage less than or equal to the preset difference value.

For example, the current adjustment circuit further comprises an amplifier, connected with the follower circuit and the current adjustment circuit respectively and configured to receive and amplify the output voltage of the follower circuit and then to send the output voltage to the current adjustment circuit.

For example, the photosensitive element comprises a photodiode and the follower circuit comprises a three-transistor image sensing circuit or a four-transistor image sensing circuit.

For example, the follower circuit further comprises a reset transistor connected with the source follower transistor, and the active pixel sensor further comprises a gain determination circuit, which is connected with the reset transistor and is configured to output a first reset voltage and a second reset voltage to the follower circuit so as to determine a following gain of the follower circuit.

Embodiments of the present disclosure provide an imager comprising a plurality of pixel units disposed in an array, and at least one of the pixel units comprises the above-mentioned active pixel sensor.

An embodiment of the present disclosure provides a driving method of an active pixel sensor, comprising a reset period, a photosensitive period and a readout period, and the reset period comprises: collecting the output voltage of the follower circuit and adjusting the bias current of the source follower transistor according to the output voltage, so as to adjust the output voltage to the preset range.

For example, adjusting the output voltage to the preset range comprises: comparing the output voltage with a preset voltage to obtain a voltage difference value; generating a current control signal in a case where the voltage difference value is greater than a preset difference value; and adjusting the bias current of the source follower transistor according to the current control signal, so as to make the voltage difference value between the output voltage of the active pixel sensor and the preset voltage be less than or equal to the preset difference value.

For example, the driving method further comprises obtaining a following gain of the follower circuit, and a method of obtaining the following gain comprises: outputting a first reset voltage by a reset voltage input end provided in the active pixel sensor and reading out a first value from the active pixel sensor; outputting a second reset voltage by the reset voltage input end provided in the active pixel sensor and reading out a second value from the active pixel sensor; and determining the following gain of the active pixel sensor according to the first value and the second value.

An embodiment of the present disclosure further provides an electronic device comprising the above-mentioned imager.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
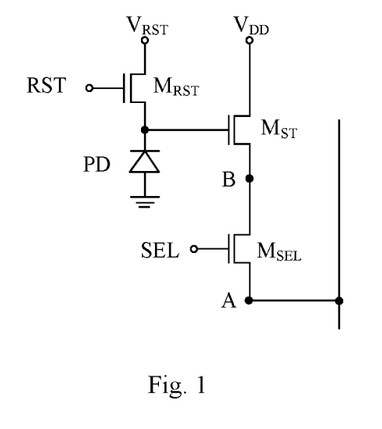
FIG. 1 is a circuit structural diagram of an active pixel sensor.

FIG. 1 is a circuit structural diagram of an active pixel sensor. As illustrated in FIG. 1, a main structure of an active pixel sensor comprises a photodiode (PD) configured to sense an illumination intensity and three metal-oxide semiconductor (MOS) transistors. The three transistors are respectively a reset transistor $M_{RST}$, a current source follower transistor $M_{SF}$ and a row selector transistor $M_{SEL}$. An operation principle of the active pixel sensor (APS) is to output the voltage of the photodiode PD to an image process circuit by using the current source follower transistor $M_{SF}$, that is, the follower circuit comprising the current source follower transistor $M_{SF}$ and the row selector transistor $M_{SEL}$ cooperates with a silicon-based integrated circuit to detect a voltage at a node A.

The inventor finds by researching that in the circuit structure of the active pixel sensor, because irreversible drift (usually positive drift) can easily occur to a threshold voltage $V_{TH}$ of the current source follower transistor $M_{SF}$ due to applying a voltage to the current source follower transistor for a long time, and the change of the threshold voltage $V_{TH}$ could cause a cross-voltage of the current source follower transistor $M_{SF}$ to change (i.e. potentials of the node A and the node B decrease), therefore, a variation range of the output voltage of the active pixel sensor is increased. Usually, the silicon-based integrated circuit operates in a detectable range, so the increased variation range of the output voltage of the active pixel sensor would influence the amount and an overall dynamic range of the signal, resulting in an undesirable following and a deviation of the output signal.

As a result, a static operation point of the follower circuit needs to be corrected (that is, direct-current correction) before the active pixel sensor is exposed for sensing, so that the static operation point is within an appropriate voltage range and the output voltage of the follower circuit is within a detectable range of the integrated circuit.

Figure 2:
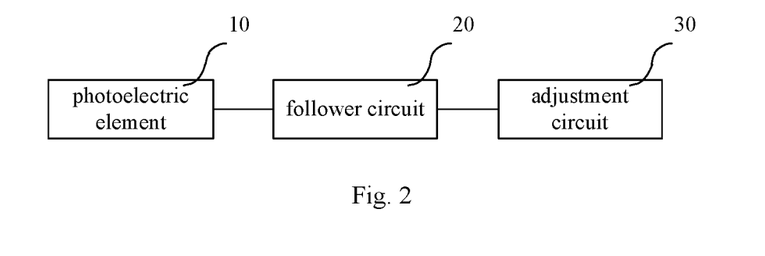
FIG. 2 is a schematic block diagram of an active pixel sensor provided by an embodiment of the present disclosure.

FIG. 2 is a schematic block diagram of an active pixel sensor provided by an embodiment of the present disclosure As illustrated in FIG. 2, an embodiment of the present disclosure provides an active pixel sensor, a main structure of that active pixel sensor comprises a photosensitive element 10, a follower circuit 20 and an adjustment circuit 30. The photosensitive element 10 is configured to convert a light signal into an electrical signal. The follower circuit 20 is connected with the photosensitive element 10 and is configured to convert the electrical signal into an output voltage. The adjustment circuit 30 is connected with the follower circuit 20 and is configured to collect the output voltage of the follower circuit 20 and to adjust a bias current of a source follower transistor in the follower circuit 20 according to the output voltage, so as to adjust the output voltage of the follower circuit 20 to a preset range.

In the active pixel sensor provided by the embodiments of the present disclosure, the adjustment circuit is provided to collect the output voltage of the active pixel sensor and adjust the bias current of the source follower transistor in the active pixel sensor according to the output voltage, so as to adjust the output voltage of the active pixel sensor to a preset range, so that the output voltage of the active pixel sensor changes within a detectable range. In this way, defects, such as the undesirable following and the deviation of the output signal caused by an increased variation range of the output voltage of the active pixel sensor, can be effectively overcome.

In the embodiments of the present disclosure, the photosensitive element can adopt a PN junction photodiode. In practical application, the photosensitive element can also adopt other semiconductors to achieve a photoelectric conversion, such as a pinned photodiode, a PIN photodiode and the like, which is not specifically limited by the embodiments of the present disclosure.

In the embodiments of the present disclosure, the follower circuit can adopt a 3-transistor (3T-type) image sensing circuit comprising a reset transistor, a current source follower transistor and a row selector transistor, and can also adopt a 4-transistor (4T-type) image sensing circuit comprising a reset transistor, a source follower transistor, a select transistor and a transfer transistor. In practical application, the follower circuit can also adopt other image sensors of other structural types, which is not limited by the embodiments of the present disclosure.

In the embodiments of the present disclosure, the adjustment circuit comprises a current source circuit and a current adjustment circuit. The current source circuit is connected with the follower circuit and is configured to keep a current of the source follower transistor constant to ensure that a voltage difference between the source voltage and the gate voltage is constant, so as to achieve the source voltage following the gate voltage. The current adjustment circuit is connected with the follower circuit and the current source circuit respectively, and is configured to collect the output voltage of the follower circuit and to adjust an output current of the current source circuit according to the output voltage, so as to adjust the output voltage of the follower circuit to the preset range.

In an example, the current adjustment circuit further comprises a collection unit, a comparison unit, a judgment unit and a control unit. The collection unit is connected with an output end of the amplifier and is configured to collect the output voltage of the output end of the amplifier. The comparison unit is connected with the collection circuit and is configured to compare the output voltage with a preset voltage so as to obtain a voltage difference value. The judgment circuit is connected with the comparison circuit and is configured to judge whether the voltage difference value is greater than a preset difference value or not. The control circuit is connected with the judgment circuit and is configured to generate a current control signal and send the current control signal to the current source circuit upon the voltage different value being greater than the preset difference value, so as to make the voltage difference value between the output voltage of the active pixel sensor and the preset voltage less than or equal to the preset difference value.

Technical solutions of the embodiments of the present disclosure are described in details below through specific embodiments.

First Embodiment

Figure 3:
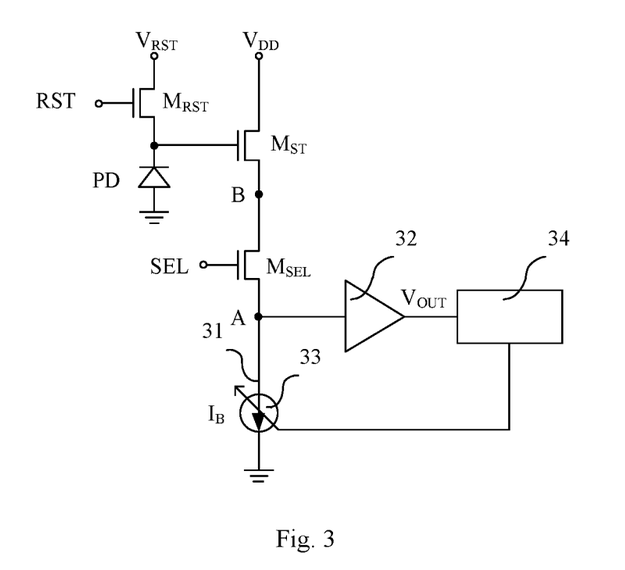
FIG. 3 is a schematic structural diagram of an active pixel sensor provided by a first embodiment of the present disclosure.

FIG. 3 is a schematic structural diagram of an active pixel sensor provided by a first embodiment of the present disclosure. The active pixel sensor of the embodiment is of 3T type. The photosensitive element 10 comprises a photodiode PD, and the follower circuit 20 comprises a rest transistor $M_{RST}$, a source follower transistor $M_{SF}$ and a select transistor $M_{SEL}$. The adjustment circuit 30 comprises a column bus line 31, an amplifier 32, a current source circuit 33 and a current adjustment circuit 34.

As illustrated in FIG. 3, a gate electrode of the rest transistor $M_{RST}$ is electrically connected with a reset signal input end RST, a first electrode of the rest transistor $M_{RST}$ is electrically connected with a reset voltage input end, a second electrode of the rest transistor $M_{RST}$ is electrically connected with a first electrode of the photodiode PD and a gate electrode of the source follower transistor $M_{SF}$ respectively, and a second electrode of the photodiode PD is grounded. The source follower transistor $M_{SF}$ functions as the source follower, the gate electrode of the source follower transistor $M_{SF}$ is electrically connected with the first electrode of the photodiode PD and the second electrode of the reset transistor $M_{RST}$ respectively, a first electrode of the source follower transistor $M_{SF}$ is electrically connected with a voltage input end and a second electrode of the source follower transistor $M_{SF}$ is electrically connected with a first electrode of the select transistor $M_{SEL}$. A gate electrode of the select transistor $M_{SEL}$ is connected with a readout control end SEL, a first electrode of the select transistor $M_{SEL}$ is connected with the second electrode of the source follower transistor $M_{SF}$ and the second electrode of the select transistor $M_{SEL}$ is connected with the column bus line 31. The column bus line 31 is electrically connected with the second electrode of the select transistor $M_{SEL}$, one end of the current source circuit 33 is connected with the column bus line 31 and the other end of the current source circuit 33 is grounded. An input end of the amplifier 32 is electrically connected with the column bus line 31 and an output end of the amplifier 32 is electrically connected with the current adjustment circuit 34. An input end of the current adjustment circuit 34 is electrically connected with the output end of the amplifier 32 and an output end of the current adjustment circuit 34 is electrically connected with the current source circuit 33.

In practical applications, the first electrode of the photodiode PD is an N terminal, and the second electrode of the photodiode PD is a P terminal. The first electrode of the reset transistor $M_{RST}$, the first electrode of the source follower transistor $M_{SF}$ and the first electrode of the select transistor $M_{SEL}$ are drain electrodes (or source electrodes), and the second electrode of the reset transistor $M_{RST}$, the second electrode of the source follower transistor $M_{SF}$ and the second electrode of the select transistor $M_{SEL}$ are source electrodes (or drain electrodes). The current adjustment circuit 34 can adopt a control circuit MCU or a digital converter AD and a control circuit MCU.

The operation processes of the active pixel sensor provided by the embodiment of the present disclosure at least comprise a rest period, a photosensitive period and a readout period.

During the reset period, the rest signal input end RST provides a high level signal and the reset transistor $M_{RST}$ is turned on. The N terminal of the photodiode PD is connected to the reset voltage input end through the reset transistor $M_{RST}$. Under the reset voltage $V_{RST}$, the photodiode PD is reversely biased to the reset voltage $V_{RST}$, and a PN junction capacitor of the photodiode PD is charged by the reset voltage $V_{RST}$. Under control of the reset voltage $V_{RST}$, the source follower transistor $M_{SF}$ is turned on. Under control of the readout control end SEL, the select transistor $M_{SEL}$ outputs the electrical signal to the adjustment circuit 30, i.e. the input end of the amplifier 32. The electrical signal is received by the input end of the amplifier 32 and is amplified and then sent out as an output voltage $V_{OUT}$ through the output end of the amplifier 32. The current adjustment circuit 34 collects the output voltage $V_{OUT}$ output by the output end of the amplifier 32 and compares the output voltage with a preset voltage. In a case where the difference value between the output voltage $V_{OUT}$ and the preset voltage is greater than a preset difference value, the current adjustment circuit 34 sends out a control signal to the current source circuit 33. After the current source circuit 33 receives the control signal output by the current adjustment circuit 34, the current source circuit 33 adjusts its output current $I_B$ and maintains the current of the source follower transistor $M_{SF}$ at an appropriate value, so that the potential of the node B is adjusted, and the difference value between the potential of the node A as well as the output voltage $V_{OUT}$ of the amplifier 32 and the preset voltage is less than or equal to the preset difference value. In this way, the static operation point of the follower circuit 20 is adjusted to an appropriate range, so that the output voltage of the active pixel sensor is matched to a detectable range of the integrated circuit. In this situation, the output voltage of the node A is V1.

During the photosensitive period, the rest signal input end RST provides a low level signal and the reset transistor $M_{RST}$ is turned off. When the PN junction of the photodiode is irradiated by incident light, light quantum is excited to generate electron-hole pairs on the PN junction of the photodiode PD, which causes charges of the PN junction capacitance to recombine and to decline. Because the N terminal of the photodiode PD is connected with the gate electrode of the source follower transistor $M_{SF}$ and under the action of the input voltage $V_{DD}$ of the voltage input end and the current source circuit 33, the second electrode of the source follower transistor $M_{SF}$ outputs the output voltage of the photodiode PD to the first electrode of the select transistor $M_{SEL}$.

The active pixel sensor enters the readout period when the exposure is ended. During the readout period, the reset signal input end RST provides a high level signal, the readout control end SEL provides a high level signal, and the select transistor $M_{SEL}$ outputs the electrical signal output by the photodiode PD to the column bus line 31. In this situation, the output voltage of the node A is $V_2$. In this situation, because the output current of the current source circuit 34 has been adjusted during the reset period, and under the action of the current source circuit 34, the static operation point of the follower circuit 20 returns to an appropriate range, so as to make the output voltage $V_2$ of the node A be matched with the detectable range of the integrated circuit.

According to an output voltage difference value before and after the light sense, and further combined with the following gain of the follower circuit 20, the light signal $\Delta V$ generated by the photosensitive element 10 can be obtained. For example, the following gain of the follower circuit 20 is gm and the light signal $\Delta V$ generated by the photosensitive element 10 is (V2−V1)/gm.

In the embodiment, the static operation point of the follower circuit 20 is adjusted by the current source circuit 33 during the reset period, so as to make the output voltage of the active pixel sensor before and after the light sense be within a preset range to match the detectable range of the integrated circuit. The current source circuit 33 comprises a circuit that provides a constant current to allow the current of the source follower transistor $M_{SF}$ to keep constant and to ensure that the voltage difference between the second electrode and the gate electrode of the source follower transistor $M_{SF}$ is constant, so as to allow the voltage of the second electrode of the source follower transistor $M_{SF}$ to follow the voltage of the gate electrode of the source follower transistor $M_{SF}$. As a result, adjusting the current value of the current source circuit 33 can change the voltage value of the second electrode (i.e. the node B in FIG. 3) of the source follower transistor $M_{SF}$, so as to change the voltage value of the node A and the output voltage $V_{OUT}$ of the output end of the amplifier 32. It can be seen that the potential of the node A and the node B can be adjusted to a desirable range by adjusting the magnitude of the bias current $I_B$ of the source follower transistor $M_{SF}$ through the judgment of the current adjustment circuit 34.

In practical application, the correction processing comprising collection, comparison, calculation and adjustment and the like can be implemented before each operation. Three operation modes can be comprised when the active pixel sensor of the embodiment is in operation: an adjustment mode, a reset mode and an integration mode. In the adjustment mode, the correction processing comprising collection, comparison, calculation and adjustment and the like is implemented to make the voltage output by the active pixel sensor change within a detectable range. In the reset mode, the reset signal input end RST provides a high level signal and the reset transistor $M_{RST}$ is turned on. In the integration mode, the reset signal input end RST provides a low level signal and the reset transistor $M_{RST}$ is turned off, and an electrical signal is output.

The active pixel sensor provided by the embodiment adjusts the magnitude of the bias current by detecting the potential of the node A, so as to adjust the potential of the node A to a desirable range and to make the output voltage of the active pixel sensor change within a detectable range.

Second Embodiment

Figure 4:
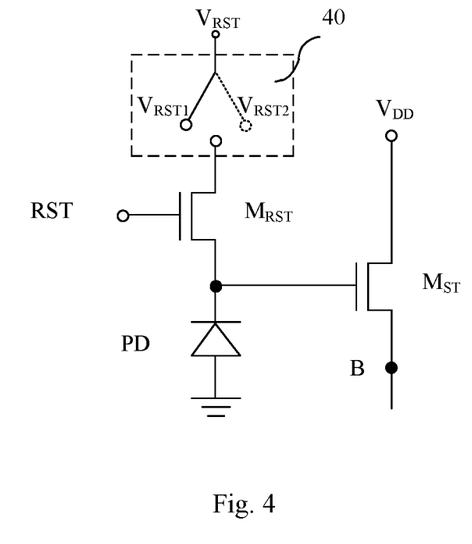
FIG. 4 is a schematic structural diagram of an active pixel sensor provided by a second embodiment of the present disclosure.

FIG. 4 is a schematic structural diagram of an active pixel sensor provided by a second embodiment of the present disclosure. Based on the technical solution of the above mentioned first embodiment, the active pixel sensor of the embodiment further comprises a gain determination circuit 40. As illustrated in FIG. 4, considering that adjusting the bias current $I_B$ can change the following gain of the source follower transistor $M_{SF}$, the embodiment is provided with the gain determination circuit 40 to determine the actual following gain of the follower circuit 20. An input end of the gain determination circuit 40 is electrically connected with the reset voltage input end and an output end of the gain determination circuit 40 is electrically connected with the first electrode of the reset transistor $M_{RST}$. The gain determination circuit 40 is configured to adjust the reset voltage $V_{RST}$ input by the reset voltage input end to output a first reset voltage $V_{RST1}$ or a second reset $V_{RST2}$. When the gain determination circuit 40 outputs the first reset voltage $V_{RST1}$, read out a first value from the active pixel sensor; when the gain determination circuit 40 outputs the second reset voltage $V_{RST2}$, read out a second value from the active pixel sensor. The real time following gain value can be determined by reading out the value twice.

A process of determining the following gain can be performed accompanying with the operation of the reset period and the readout period. For example, based on the technical solution of the above mentioned first embodiment, during the reset period, the gain determination circuit 40 outputs a first reset voltage $V_{RST1}$, and a first value $V_A$ is read out from the node A of the active pixel sensor. During the readout period, the gain determination circuit 40 outputs a second reset voltage $V_{RST2}$, and a second value $V_A'$ is read out from the node A of the active pixel sensor. The actual following gain gm of the follower circuit 20 is obtained as $(V_A'-V_A)/(V_{RST2}-V_{RST1})$ as a result.

Third Embodiment

Figure 5:
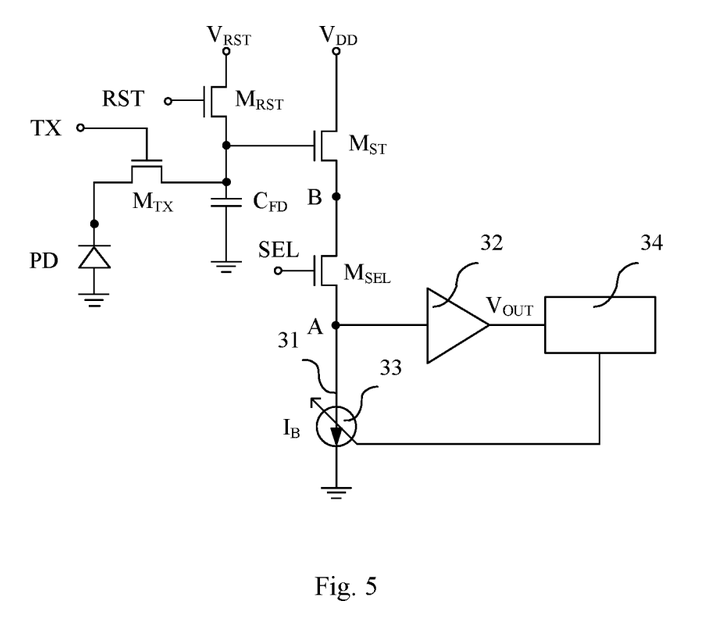
FIG. 5 is a schematic structural diagram of an active pixel sensor provided by a third embodiment of the present disclosure.

FIG. 5 is a schematic structural diagram of an active pixel sensor provided by a third embodiment of the present disclosure. The active pixel sensor of the embodiment is of 4-transistor type. The photosensitive element 10 comprises a photodiode PD; the adjustment circuit 30 comprises a column bus line 31, an amplifier 32, a current source circuit 33 and a current adjustment circuit 34; the follower circuit 20 comprises a reset transistor $M_{RST}$, a source follower transistor $M_{SF}$, a select transistor $M_{SEL}$, a transfer transistor $M_{TX}$ and a floating diode capacitor $C_{PD}$.

As illustrated in FIG. 5, a gate electrode of the reset transistor $M_{RST}$ is electrically connected with the reset signal input end RST, a first electrode of the reset transistor $M_{RST}$ is electrically connected with the reset voltage input end and a second electrode of the reset transistor $M_{RST}$ is respectively electrically connected with a first electrode of the transfer transistor $M_{TX}$, a first electrode of the floating diode capacitor $C_{PD}$ and a gate electrode of the source follower transistor $M_{SF}$; a second electrode of the floating diode capacitor $C_{PD}$ is grounded. A gate electrode of the transfer transistor $M_{TX}$ is electrically connected with a transfer signal input end TX, a first electrode of the transfer transistor $M_{TX}$ is respectively electrically connected with the second electrode of the reset transistor $M_{RST}$, the first electrode of the floating diode capacitor $C_{PD}$ and the gate electrode of the source follower transistor $M_{SF}$, and a second electrode of the transfer transistor $M_{TX}$ is electrically connected with a first electrode of the photodiode PD; a second electrode of the photodiode PD is grounded. The source follower transistor $M_{SF}$ functions as a source follower and the gate electrode of the source follower transistor $M_{SF}$ is respectively electrically connected with the second electrode of the reset transistor $M_{RST}$, the first electrode of the floating diode capacitor $C_{PD}$ and the first electrode of the transfer transistor $M_{TX}$. The first electrode of the source follower transistor $M_{SF}$ is electrically connected with a voltage input end and the second electrode of the source follower transistor $M_{SF}$ is electrically connected with a first electrode of the select transistor $M_{SEL}$. A gate electrode of the select transistor $M_{SEL}$ is connected with readout control end SEL, the first electrode of the select transistor $M_{SEL}$ is electrically connected with the second electrode of the source follower transistor $M_{SF}$, and the second electrode of the select transistor $M_{SEL}$ is connected with the column bus line 31. The column bus line 31 is electrically connected with the second electrode of the select transistor $M_{SEL}$. One end of the current source circuit 33 is electrically with the column bus line 31 and the other end is grounded. An input end of the amplifier 32 is electrically connected with the column bus line 31 and an output end of the amplifier 32 is electrically connected with the current adjustment circuit 34. An input end of the current adjustment circuit 34 is electrically connected with the output end of the amplifier 32 and the output end of the current adjustment circuit 34 is electrically connected with the current source circuit 33.

In practical applications, the first electrode of the photodiode PD is an N terminal and the second electrode is a P terminal. The first electrode of the reset transistor $M_{RST}$, the first electrode of the transfer transistor $M_{TX}$, the first electrode of the source follower transistor $M_{SF}$ and the first electrode of the select transistor $M_{SEL}$ are drain electrodes (or source electrodes), and the second electrode of the reset transistor $M_{RST}$, the second electrode of the transfer transistor $M_{TX}$, the second electrode of the source follower transistor $M_{SF}$ and the second electrode of the select transistor $M_{SEL}$ are source electrodes (or drain electrodes). The current adjustment circuit 34 can adopt a control circuit MCU or a digital converter AD and a control circuit MCU.

The operation processes of the active pixel sensor provided by the embodiment of the present disclosure at least comprise a rest period, a photosensitive period and a readout period.

During the reset period, the rest signal input end RST provides a high level signal and the transfer signal input end TX provide a high level signal. The reset transistor $M_{RST}$ is turned on and the floating diode capacitor $C_{PD}$ is charged to a reset voltage $V_{RST}$. The transfer transistor $M_{TX}$ is turned on and the N terminal of the photodiode PD is connected to the reset voltage input end through the reset transistor $M_{RST}$ and the transfer transistor $M_{TX}$. Under the reset voltage $V_{RST}$, the photodiode PD is reversely biased and all accumulated charges of the photodiode PD are removed to achieve reset. Under the action of the input voltage $V_{DD}$ of the voltage input end and the current source circuit 33, the second electrode of the source follower transistor $M_{SF}$ outputs the electrical signal to the first electrode of the select transistor $M_{SEL}$. Under the control of the readout control end SEL, the select transistor $M_{SEL}$ outputs the electrical signal to the adjustment circuit 30, that is, the input end of the amplifier 32. The electrical signal is received by the input end of the amplifier 32 and is amplified and then sent out as an output voltage $V_{OUT}$ through the output end of the amplifier 32. The current adjustment circuit 34 collects the output voltage $V_{OUT}$ output by the output end of the amplifier 32 and compares the output voltage with a preset voltage. In a case where the difference value between the output voltage $V_{OUT}$ and the preset voltage is greater than a preset difference value, the current adjustment circuit 34 sends out a control signal to the current source circuit 33. After the current source circuit 33 receives the control signal output by the current adjustment circuit 34, the current source circuit 33 adjusts its output current $I_B$ and maintains the current of the source follower transistor $M_{SF}$ at an appropriate value, so that the potential of the node B is adjusted, and the difference value between the potential of the node A as well as the output voltage $V_{OUT}$ of the amplifier 32 and the preset voltage is less than or equal to the preset difference value. In this way, the static operation point of the follower circuit 20 is adjusted to an appropriate range and the output voltage of the active pixel sensor is matched to a detectable range of the integrated circuit. In this situation, the output voltage of the node A is V1. The principle for adjusting the potential of the node A and the potential of the node B in this embodiment is same as that of the above-mentioned first embodiment, and details are not described herein again.

During the photosensitive period, the rest signal input end RST provides a low level signal and the reset transistor $M_{RST}$ is turned off. The transfer signal input end TX provide a low level signal and the transfer transistor $M_{TX}$ is turned off. During an exposure process, the photodiode PD performs photoelectric conversion and the voltage of the photodiode PD begins to decline from the reset voltage $V_{RST}$ due to a recombination of the photon-generated carriers, while the voltage of the floating diode capacitor $C_{PD}$ maintains at an initial value due to the turn-off of the transfer transistor $M_{TX}$.

The active pixel sensor enters the readout period when the exposure is ended. During the readout period, the reset signal input end RST provides a high level signal, the readout control end SEL provides a high level signal and the transfer signal input end TX provide a high level signal. The transfer transistor $M_{TX}$ is turned on for a second time. The photodiode PD transfers charges to the floating diode capacitor $C_{PD}$ to form an electrical signal including pixel information. Under the action of the input voltage $V_{DD}$ of the voltage input end and the current source circuit 33, the second electrode of the source follower transistor $M_{SF}$ outputs the electrical signal to the first electrode of the select transistor $M_{SEL}$. Under the control of the readout control end SEL, the select transistor $M_{SEL}$ outputs the electrical signal to the column bus line 31. In this situation, because the output current of the current source circuit 34 has been adjusted during the reset period, and under the action of the current source circuit 34, the static operation point of the follower circuit 20 returns to an appropriate range. In this situation, the output voltage of the node A is $V_2$.

The active pixel sensor provided by the embodiment adjusts the magnitude of the bias current by detecting the potential of the node A, so as to adjust the potential of the node A to a desirable range and to make the output voltage of the active pixel sensor change within a detectable range.

Forth Embodiment

Based on the technical solution of the aforesaid third embodiment, the active pixel sensor of the embodiment further comprises a gain determination circuit. The structure and operation principle of the gain determination circuit are same as those of the aforesaid second embodiment, which is not repeated here.

Fifth Embodiment

Figure 6:
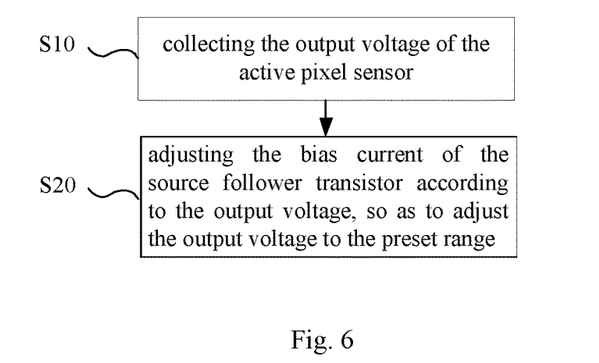
FIG. 6 is a flow diagram of a driving method of an active pixel sensor provided by a fifth embodiment of the present disclosure.

Based on the technical solutions of the aforesaid embodiments, an embodiment of the present disclosure further provides a driving method of an active pixel sensor. FIG. 6 is a flow diagram of a driving method of an active pixel sensor provided by an embodiment of the present disclosure. As illustrated in FIG. 6, the driving method of the active pixel sensor comprises a reset period, a photosensitive period and a readout period. The reset period comprises:

S10, collecting the output voltage of the active pixel sensor; and

S20, adjusting the bias current of the source follower transistor according to the output voltage, so as to adjust the output voltage to the preset range.

The driving method of the active pixel sensor provided by the embodiment of the present disclosure adjusts the output voltage of the active pixel sensor to a preset range by collecting the output voltage of the active pixel sensor and adjusting the bias current of the source follower transistor of the active pixel sensor according to the output voltage, so as to adjust the voltage output of the active pixel sensor to a preset range and make the voltage output by the active pixel sensor change within a detectable range. In this way, the influence of the threshold voltage changed of the source follower transistor on the voltage variation range is effectively overcome and the accuracy of the output signal is improved.

For example, adjust the output voltage to the preset range comprises:

S21, comparing the output voltage and the preset voltage to obtain a voltage difference value;

S22, generating a current control signal and sending the current control signal to the source current circuit in a case where the voltage difference value is greater than a preset difference value; and S23, adjusting the bias current of the source follower transistor according to the current control signal to make the voltage difference value between the output voltage of the active pixel sensor and the preset voltage be less than or equal to the preset difference value.

For example, considering that the bias current can change the following gain of the source follower transistor, the driving method of the embodiment further comprises: outputting a first reset voltage by the reset voltage input end provided in the active pixel sensor and reading out a first value from the active pixel sensor; outputting a second reset voltage by the reset voltage input end provided in the active pixel sensor and reading out a second value from the active pixel sensor; and determining the following gain of the active pixel sensor according to the first value and the second value.

Sixth Embodiment

Figure 7:
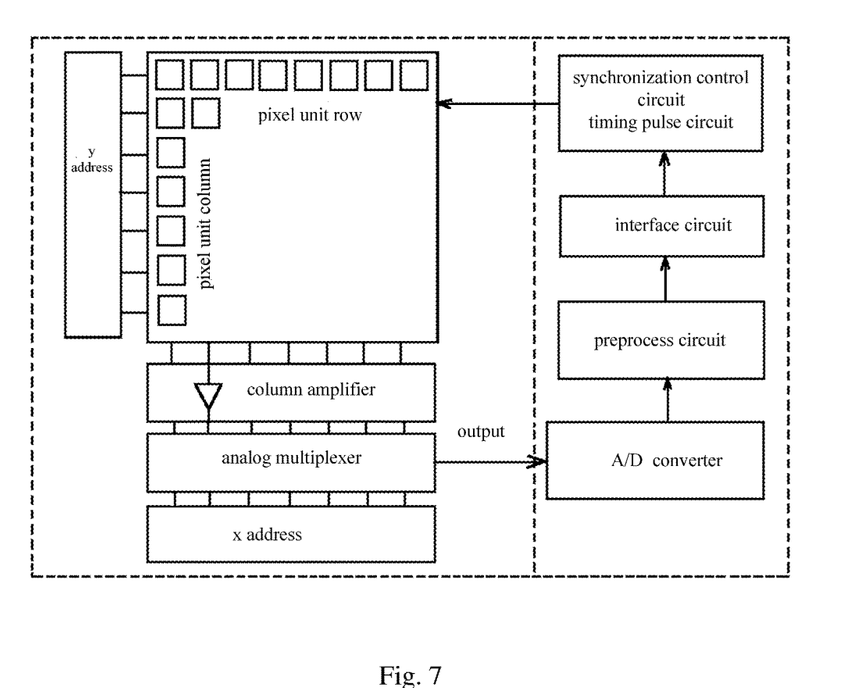
FIG. 7 is a schematic block diagram of an imager provided by a sixth embodiment of the present disclosure.

An embodiment of the present disclosure further provides an imager, and FIG. 7 is a schematic block diagram of the imager. The imager comprises a pixel unit array and a peripheral circuit, the pixel unit array and the peripheral circuit can be for example integrated on a same silicon-based chip. The pixel unit array comprises pixel units arranged in an array, and for example, as illustrated in the FIG. 7, the pixel unit array is arranged along an X direction and a Y direction to form a matrix. Each pixel unit in the matrix has addresses in the X direction and in the Y direction (e.g. a row direction and a row direction) and can be selected by address decoders in these two directions of a corresponding row line and a corresponding column line. The output current/voltage signal is amplified and then sent to an analog-digital converter to be performed analog-digital conversion to generate and output a digital signal. Each pixel unit of the above mentioned imager comprises the active pixel sensor of any one embodiment of the present disclosure.

Seventh Embodiment

Figure 8:
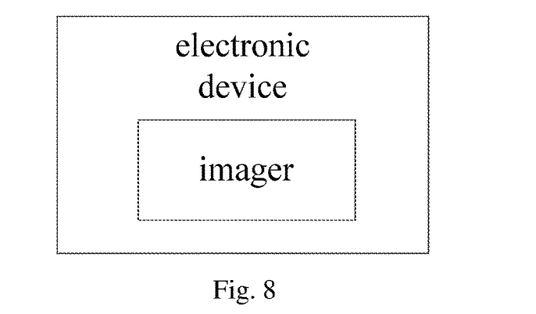
FIG. 8 is a schematic block diagram of an electronic device provided by a seventh embodiment of the present disclosure.

An embodiment of the present disclosure further provides an electronic device, and FIG. 8 is a schematic block diagram of the electronic device. The electronic device comprises the imager described above. The electronic device can be a liquid crystal panel, an electronic paper, an OLED panel, a cellphone, a tablet computer, a television, a monitor, a laptop, a digital photo frame, a navigator and the like. What are described above is related to the illustrative embodiments of the disclosure only and not limitative to the scope of the disclosure; the scopes of the disclosure are defined by the accompanying claims.

The application claims priority to the Chinese patent application No. 201710612873.1, filed on Jul. 25, 2017, the entire disclosure of which is incorporated herein by reference as part of the present application.

What is claimed is:

1. An active pixel sensor, comprising:
a photosensitive element, configured to convert a received light signal into an electrical signal;
a follower circuit, connected with the photosensitive element and configured to convert the electrical signal into an output voltage, the follower circuit comprising a source follower transistor; and
an adjustment circuit, connected with the follower circuit and configured to collect the output voltage of the follower circuit and to adjust a bias current of the source follower transistor according to the output voltage, so as to adjust the output voltage to a preset range;
wherein the adjustment circuit comprises:
a current source circuit, connected with the follower circuit and configured to keep a current of the source follower transistor constant; and
a current adjustment circuit, connected with the follower circuit and the current source circuit respectively, and configured to collect the output voltage of the follower circuit and to adjust an output current of the current source circuit according to the output voltage, so as to adjust the output voltage of the follower circuit to the preset range.

2. The active pixel sensor according to claim 1, wherein the current adjustment circuit comprises:
a collection circuit, connected with the follower transistor and configure to collect the output voltage of the follower circuit;
a comparison circuit, connected with the collection circuit and configured to compare the output voltage with a preset voltage to obtain a voltage difference value;
a judgment circuit, connected with the comparison circuit and configured to judge whether the voltage difference value is greater than a preset difference value or not; and
a control circuit, connected with the judgment circuit and configured to generate a control signal to adjust the output current of the current source circuit in a case where the voltage difference value is greater than the preset difference value, so as to make the voltage difference value between the output voltage of the follower circuit and the preset voltage be less than or equal to the preset difference value.

3. The active pixel sensor according to claim 2, further comprising:
an amplifier, connected with the follower circuit and a current adjustment circuit respectively and configured to receive and amplify the output voltage of the follower circuit and then to send the output voltage to the current adjustment circuit.

4. The active pixel sensor according to claim 2, wherein the photosensitive element comprises a photodiode, and the follower circuit comprises a three-transistor image sensing circuit or a four-transistor image sensing circuit.

5. The active pixel sensor according to claim 2, wherein the follower circuit further comprises a reset transistor, and the reset transistor is connected with the source follower transistor, and the active pixel sensor further comprises a gain determination circuit, wherein the gain determination circuit is connected with the reset transistor and is configured to output a first reset voltage and a second reset voltage to the follower circuit so as to determine a following gain of the follower circuit.

6. The active pixel sensor according to claim 1, further comprising:

an amplifier, connected with the follower circuit and a current adjustment circuit respectively and configured to receive and amplify the output voltage of the follower circuit and then to send the output voltage to the current adjustment circuit.

7. The active pixel sensor according to claim 6, wherein the photosensitive element comprises a photodiode, and the follower circuit comprises a three-transistor image sensing circuit or a four-transistor image sensing circuit.

8. The active pixel sensor according to claim 6, wherein the follower circuit further comprises a reset transistor, and the reset transistor is connected with the source follower transistor, and the active pixel sensor further comprises a gain determination circuit, wherein the gain determination circuit is connected with the reset transistor and is configured to output a first reset voltage and a second reset voltage to the follower circuit so as to determine a following gain of the follower circuit.

9. The active pixel sensor according to claim 1, wherein the photosensitive element comprises a photodiode, and the follower circuit comprises a three-transistor image sensing circuit or a four-transistor image sensing circuit.

10. The active pixel sensor according to claim 9, wherein the follower circuit further comprises a reset transistor, and the reset transistor is connected with the source follower transistor, and the active pixel sensor further comprises a gain determination circuit, wherein the gain determination circuit is connected with the reset transistor and is configured to output a first reset voltage and a second reset voltage to the follower circuit so as to determine a following gain of the follower circuit.

11. The active pixel sensor according to claim 1, wherein the follower circuit further comprises a reset transistor, and the reset transistor is connected with the source follower transistor, and the active pixel sensor further comprises a gain determination circuit, wherein the gain determination circuit is connected with the reset transistor and is configured to output a first reset voltage and a second reset voltage to the follower circuit so as to determine a following gain of the follower circuit.

12. An imager, comprising a plurality of pixel units disposed in an array, wherein at least one of the pixel units comprises the active pixel sensor according to claim 1.

13. An electronic device, comprising the imager according to claim 12.

14. A driving method of the active pixel sensor according to claim 1, comprising a reset period, a photosensitive period and a readout period, wherein the reset period comprises:

collecting the output voltage of the follower circuit and adjusting the bias current of the source follower transistor according to the output voltage, so as to adjust the output voltage to the preset range.

15. The driving method according to claim 14, wherein adjusting the output voltage to the preset range comprises:

comparing the output voltage with a preset voltage to obtain a voltage difference value;

generating a control signal in a case where the voltage difference value is greater than a preset difference value; and adjusting the bias current of the source follower transistor according to the control signal, so as to make the voltage difference value between the output voltage and the preset voltage be less than or equal to the preset difference value.

16. The driving method according to claim 15, further comprising obtaining a following gain of the follower circuit, wherein a method of obtaining the following gain comprises:

inputting a first reset voltage to the follower circuit and reading out a first value from the active pixel sensor;

inputting a second reset voltage to the follower circuit and reading out a second value from the active pixel sensor; and determining the following gain of the active pixel sensor according to the first value and the second value.

17. The driving method according to claim 14, further comprising obtaining a following gain of the follower circuit, wherein a method of obtaining the following gain comprises:

inputting a first reset voltage to the follower circuit and reading out a first value from the active pixel sensor;

inputting a second reset voltage to the follower circuit and reading out a second value from the active pixel sensor; and determining the following gain of the active pixel sensor according to the first value and the second value.

* * * * *